Aug. 3, 1971

P. ISAAC 3,597,317

NUCLEAR REACTOR FUELLING MACHINE

Filed April 15, 1968

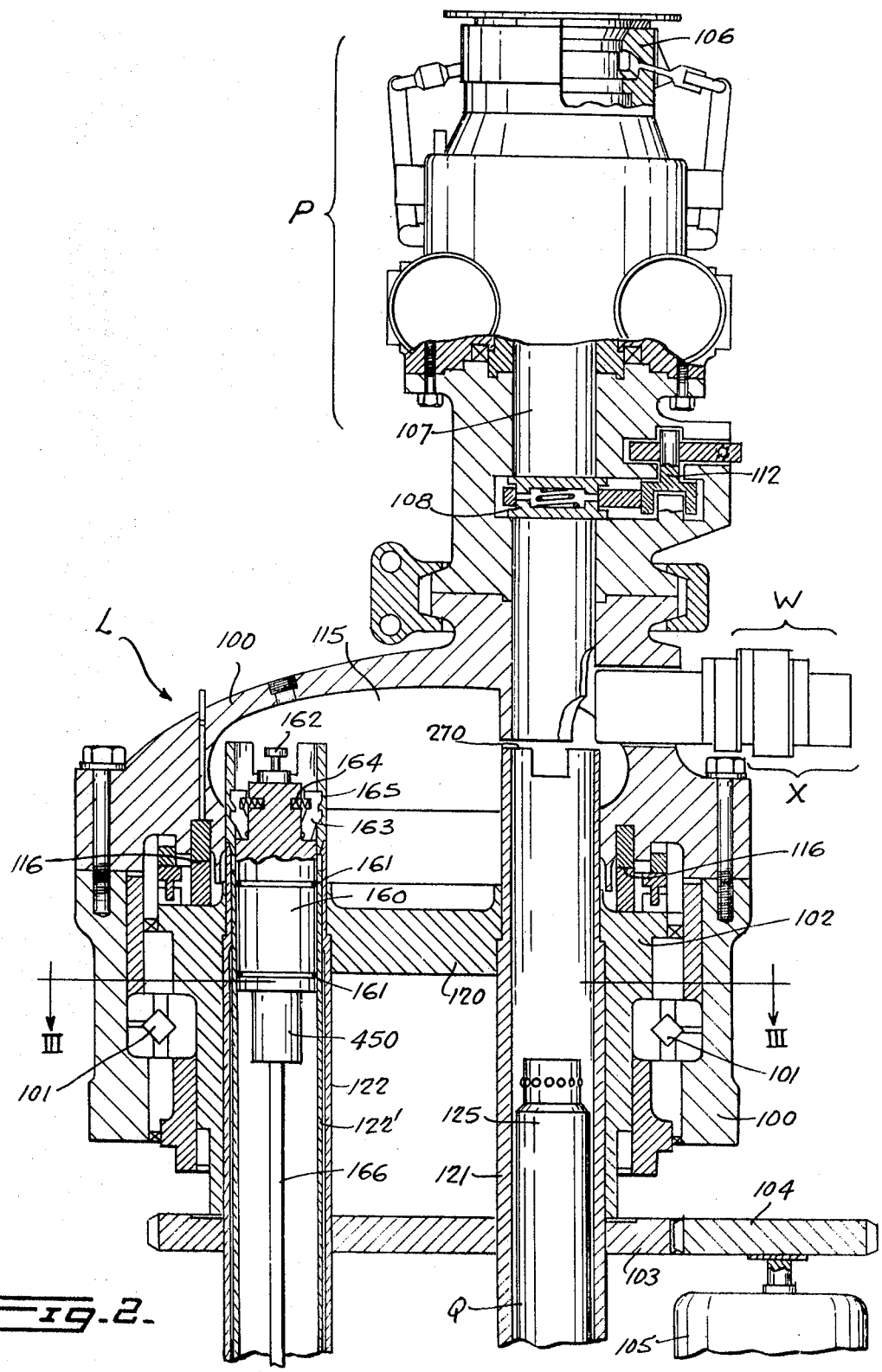

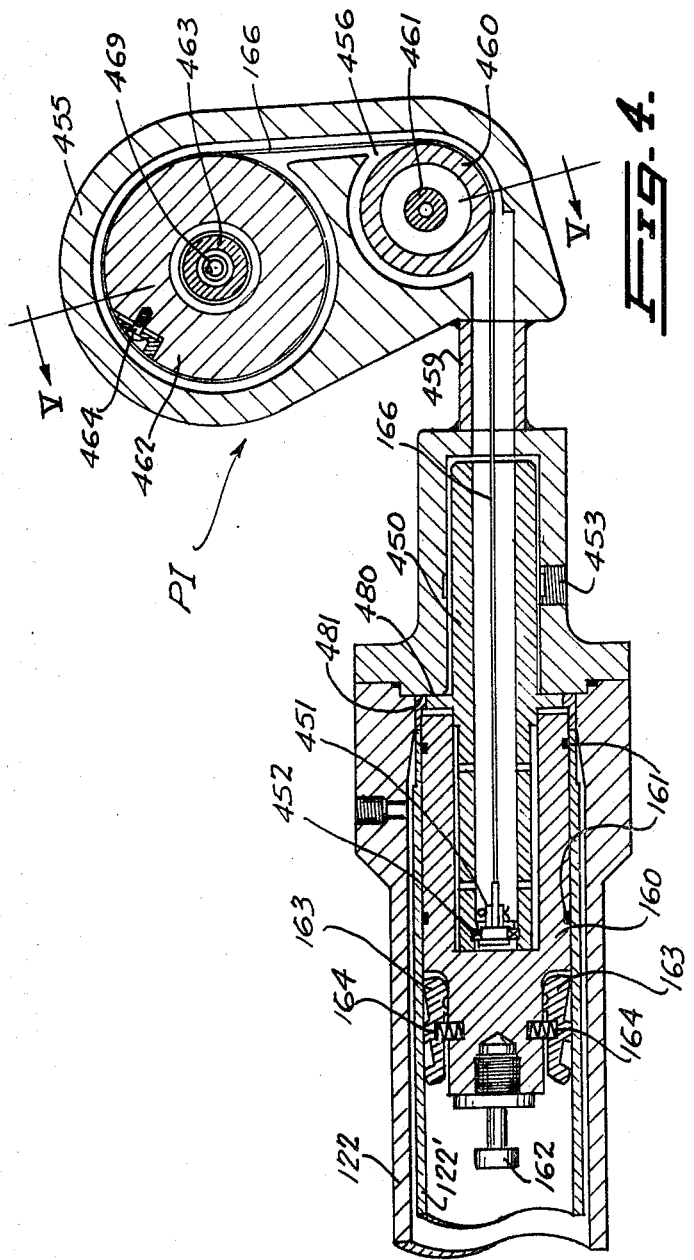

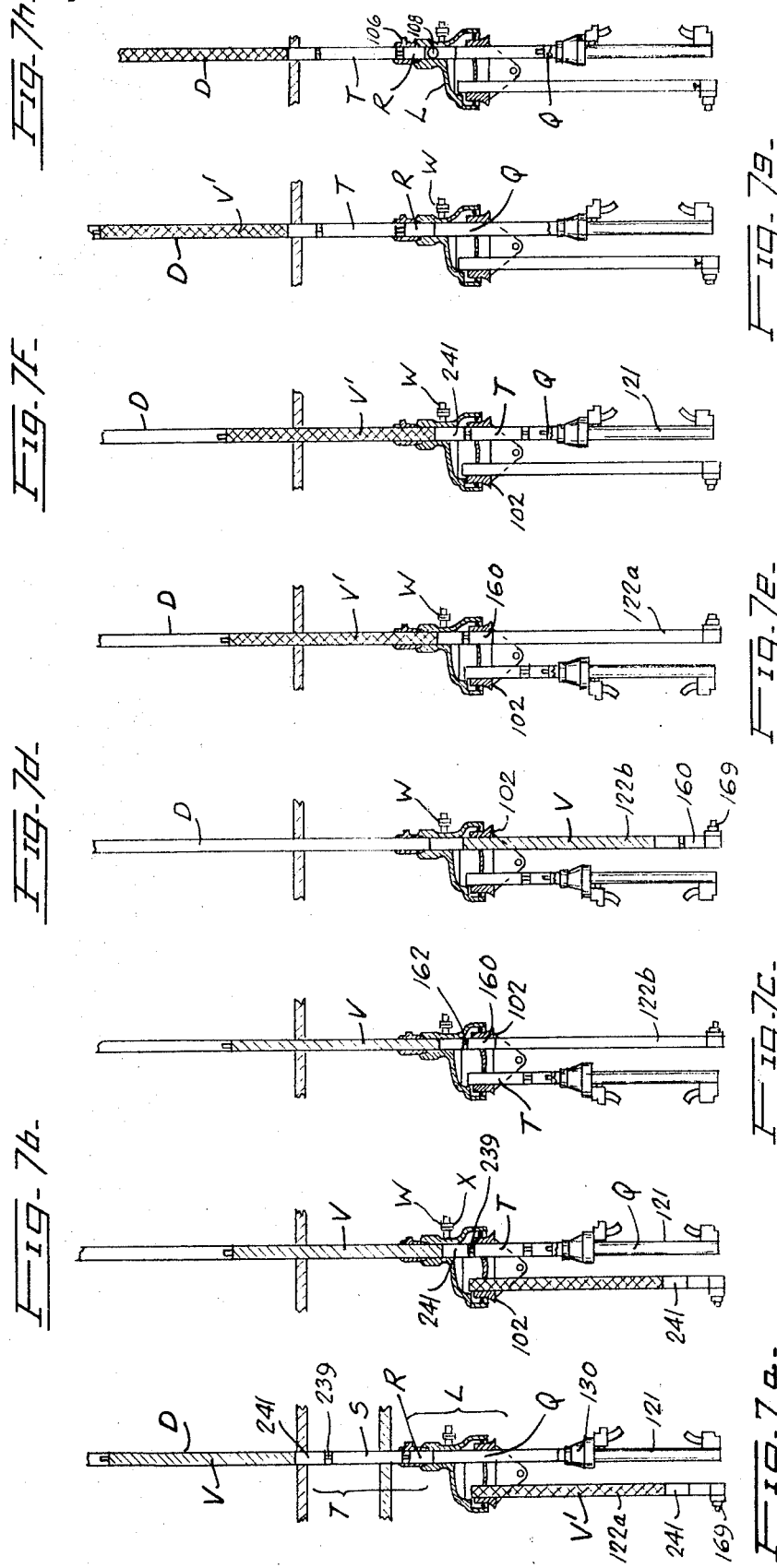

United States Patent Office 3,597,317
Patented Aug. 3, 1971

3,597,317
NUCLEAR REACTOR FUELLING MACHINE
Peter Isaac, Cooksville, Ontario, Canada, assignor to Atomic Energy of Canada Limited, Ottawa, Ontario, Canada
Filed Apr. 15, 1968, Ser. No. 721,409
Int. Cl. G21c 19/20
U.S. Cl. 176—30                                13 Claims

ABSTRACT OF THE DISCLOSURE

For inserting and extracting fuel aggregates into and from reactor fuel channels, the machine comprises a barrel for housing such a fuel aggregate and a free piston in the barrel adapted to be coupled to the fuel aggregate and to be reciprocated to displace the fuel aggregate into and out of the barrel. Displacement of the piston within the barrel is achieved by admitting pressure fluid at either end of the barrel. To indicate the position of the piston and thereby of the fuel aggregate within the barrel, a tape is attched at one end to the piston and at its other end is wound on to a reel, the rotational position of which is sensed by a potentiometer. The tape is kept tensioned by a torque generating device which acts on the reel and includes a spring tape having an inherent coiling tendency.

---

Reference is made to copending United States patent applications Ser. Nos. 721,293 to 721,295; 721,358; 721,-408 and 721,410; all filed Apr. 15, 1968.

This invention relates to a fuelling machine for handling fuel aggregates in a nuclear reactor installation.

In United States Hummel Pats. Nos. 3,157,579 issued Nov. 17, 1964 and 3,169,910 issued Feb. 16, 1965, a reactor fuelling machine is disclosed which comprises a housing having a snout portion for engaging a reactor channel, a magazine including several barrels and being rotatable selectively to align one of these barrels with a snout, and a ram mechanism aligned with the snout and the respective magazine barrel. In a loading or unloading procedure, the ram mechanism, which includes as many as six coaxial mechanical elements required to release a closure plug from the fuel channel, is moved through the aligned magazine barrel and the snout to withdraw the plug into the magazine barrel. The magazine is then rotated to align another barrel with the snout, the ram mechanism is moved through this newly aligned magazine barrel to displace a fuel string from the magazine into the channel or from the channel into the magazine. The minimum length of this fuelling machine is determined by the length of the fuel string, which is normally a multiple of that of the closure plug, plus the length of the ram mechanism which is quite considerable. The above-mentioned six coaxial mechanical elements also involve complicated driving means.

According to the present invention, the length of the fuelling machine and its complication is reduced by using a free piston reciprocable in a barrel for displacing the fuel string. A fuelling machine for handling fuel strings according to the present invention comprises (a) Barrel means for housing a said fuel string, said barrel means having one end open, and inlet means at the other end of said barrel means for admitting pressure fluid;

(b) A piston mounted for reciprocation within said barrel means for displacing said fuel string into and out of said barrel means; and (c) Means for generating a fluid pressure difference between said open end and said inlet means for moving said piston in either direction.

In a preferred embodiment of the present invention, the fuelling machine comprises a first barrel for housing a fuel string and a second barrel for housing a closure plug assembly, a piston mounted in said first barrel for displacing said fuel string into and out of said channel, and a ram mechanism mounted in said second barrel to insert and remove said closure plug assembly into and from said channel. In this concept, only the relatively short closure plug assembly is handled by the ram mechanism which is necessarily more complicated and longer, while the relatively long fuel string is handled by the relatively short piston, so that the total length of the first barrel, which essentially determines the overall length of the fuelling machine, is a minimum.

To increase the reliability of the free piston operation, the fuelling machine according to another feature of the present invention further comprises means for indicating the position of the piston relative to the barrel means. Such indicator serves two purposes. It is necessary to know the position of the piston, because, in case the piston or the fuel string were to become jammed during a loading or unloading movement, the fuel would be damaged when trying to reinsert the closure plug or to disconnect the fuelling machine from the reactor channel. If the piston is jammed within the barrel, knowledge of the exact position of the piston is also necessary, or at least helpful, for the freeing operations that would then be required.

In a specific embodiment of the present invention, the indicating means includes (i) A casing mounted on said barrel means;
(ii) A reel rotatably mounted in said casing;
(iii) Tape means having one end connected to said piston and the other end to said reel;
(iv) Torque generating means including a spring tape having an inherent coiling tendency, one end of said spring tape being connected to apply torque to said reel in a sense to wind up said tape means; and
(v) Means for sensing the rotational position of said reel.

Further features of the present invention will appear from the following specific description which is provided by way of example only. In the accompanying drawings:

FIG. 2 is a section showing the head portion of the machine of FIG. 1, this view being a section on the line II—II in FIG. 3;

FIG. 4 is a longitudinal section, showing the lower portion of a fuel barrel and an indication unit connected to the barrel, the indication unit being cut on the line IV—IV in FIG. 5;

FIG. 7 consists of a series of small scale diagrammatic views *a* to *h* demonstrating a sequence of steps in a fuel unloading and reloading operation.

OVERALL ARRANGEMENT OF FUELLING MACHINE

Figure 1:
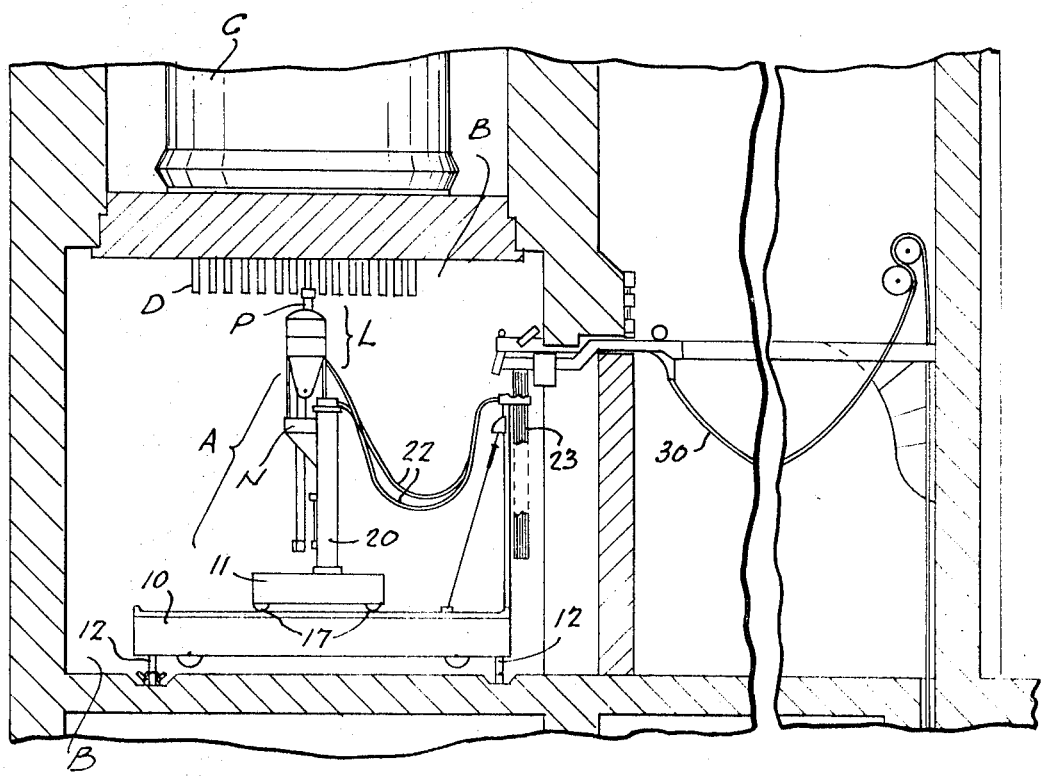
FIG. 1 is a cut-away elevation view of a fuelling machine associated with a nuclear reactor.

FIG. 1 illustrates the overall arrangement of a fuelling machine A located in a vault B beneath a nuclear reactor vessel C that has a plurality of fuel channels D that are required to be kept supplied with strings of nuclear fuel. The fuelling machine A comprises a main carriage 10 along which a trolley 11 can travel. The carriage 10 is provided with four wheels 12 for travel along the fuelling vault B in a first direction, and the trolley 11 has four wheels 17 for travel along the main carriage 10 in a second direction perpendicular to the first direction. Mounted on the trolley 11 are two upright columns 20 along which a support member N is slidable in a vertical direction. A fuelling machine head L having a snout sub-assembly P is connected to the support member N so as to be rotatable about a horizontal axis.

To couple the snout sub-assembly P to any one of the fuel channels D, the carriage 10 and the trolley 11 are moved to the appropriate location and then the machine head L is shifted upwardly to a position similar to that shown in FIG. 1.

For the required fuel supply, tubes (not shown) leading from the outside into the fuelling vault B may be disposed either in a vertical or a horizontal direction. In the latter case, coupling of the snout sub-assembly P to such supply tubes is performed by rotating the machine head L about 90° about its horizontal axis, shifting the head of the appropriate height and moving the trolley 11 and the carriage 10 to the appropriate location.

To carry out the required movements, the wheels 12 and 17, the support member N, and the machine head L are driven by hydraulic motors (not shown) in a conventional manner. Cables 22, 23, 30 for supplying the hydraulic pressure connect the fuelling machine to a pressure aggregate (not shown) which may be installed outside the fuelling vault B.

GENERAL STRUCTURE OF THE FUELLING MACHINE HEAD

Figure 3:
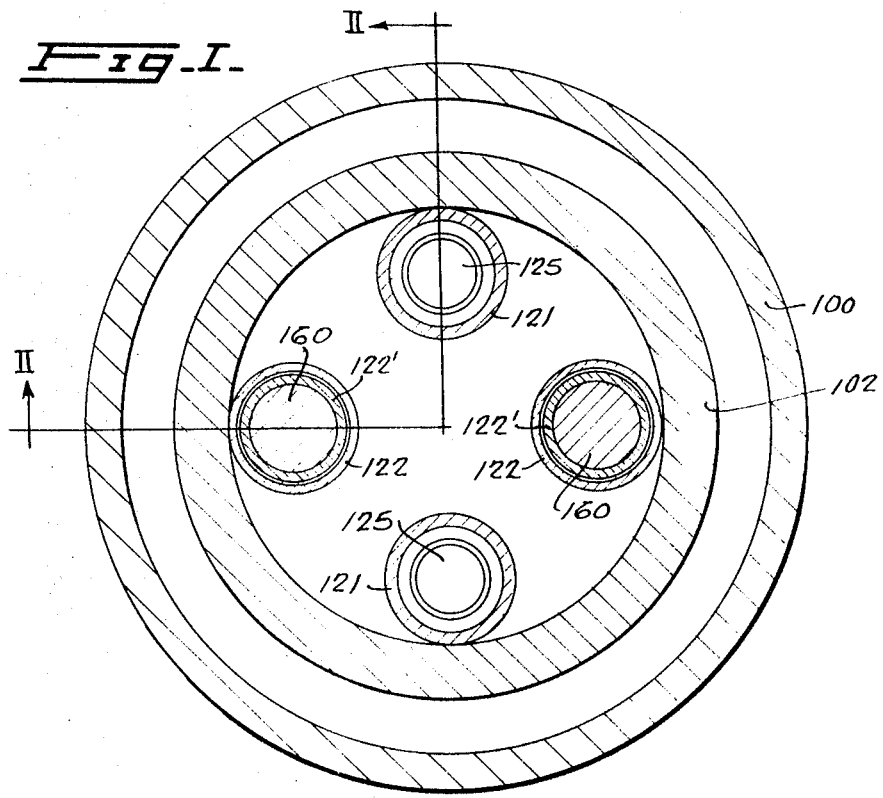
FIG. 3 is a cross-section through the fuelling machine head on the line III—III in FIG. 2.

Details of the structure of the fuelling machine head L are shown in FIGS. 2 and 3. The head consists of a main housing 100 that is connected to the support member N and contains a bearing assembly 101 by means of which a turret 102 is rotatably mounted in the machine head. The turret 102 carries a large toothed wheel 103 meshing with a toothed wheel 104 on the shaft of a motor 105, this motor being employed for indexing the turret 102 between various positions relative to the main housing 100, in the manner and for the purposes described below.

Rigidly connected to the housing 100 is the snout sub-assembly P including at its end a locking mechanism 106 for engaging the end of a reactor fuel channel D in the manner shown on the small scale in FIG. 1. The snout sub-assembly P also serves to define a channel 107 extending from the locking mechanism 106 to the turret 102, a shut-off valve 108 being located in such channel 107. The valve 108, shown in FIG. 2 in its closed position is actuated by a mechanism 112.

During operation, a space 115 defined within the turret 102 will be in communication via the channel 107 with the interior of a reactor fuel channel D under high pressure. It is therefore necessary to provide the interior of the turret 102 with means for sealing such pressure against the exterior, this being accomplished by a controlled leakage hydrostatic seal 116, no further details of which need be provided since its structure is conventional.

The turret 102 comprises a head portion 120 from which four barrels 121 and 122 extend downwardly, such barrels constituting a pair of oppositely disposed ram barrels 121 and a pair of oppositely disposed fuel barrels 122 arragned intermediate the ram barrels (FIG. 3).

Each ram barrel 121 serves to house a ram mechanism Q comprising a ram head 125 which can be displaced in the barrel 121 by a drive unit 130 (FIG. 7a) to pass through the channel 107 and extract or insert a closure plug from or into a fuel channel D engaged by the snout sub-assembly P.

As shown in FIGS. 2 and 4, each of the fuel barrels 122 is provided with a liner 122' in which there is slidably mounted a piston 160 having seals 161 encircling its perimeter. The piston 160 is "free" in the sense that it is not mechanically connected to any driving member, but is moved along the barrel 122 by fluid pressure, as more fully described below. At its forward end the piston 160 has a projecting T-shaped pin 162 and at an intermediate location it carries pivoted mechanical stops 163 that are urged radially outwardly by springs 164 into engagement with annular grooves 165 (FIG. 2) in the barrel 122. The stops 163 and grooves 165 are shaped to prevent the piston 160 from moving upward in the position shown in FIG. 2, while leaving it free to move downward.

Mounted on the rear end of the piston 160 and partly extending into the interior thereof is a sleeve 450. One end of a steel tape 166 is fixed to a pin 451 which is rotatably mounted at the front end of the sleeve 450 by means of a bearing 452.

The other end of the steel tape 166 is connected to a position indication unit PI attached to the rear end of the fuel barrel 122. The position indication unit PI is described in more detail below.

A water pressure inlet 453 is provided at the rear end of the fuel barrel 122. By generating a positive or negative differential pressure at this inlet relative to the pressure within the space 115 of the fuelling machine head L, the piston 160 is moved in either direction.

The above described general structure of the fuelling machine head has the advantage that the relatively complicated and long ram mechanism operates only the short closure plug assembly T details of which are given below, while the fuel string, the length of which is substantially greater than that of the plug assembly is moved by the short free piston. As a result, the overall length of the fuelling machine, which is essentially determined by the length of the fuel string plus that of the means for moving the fuel string, is minimized.

POSITION INDICATION UNIT

Figure 5:
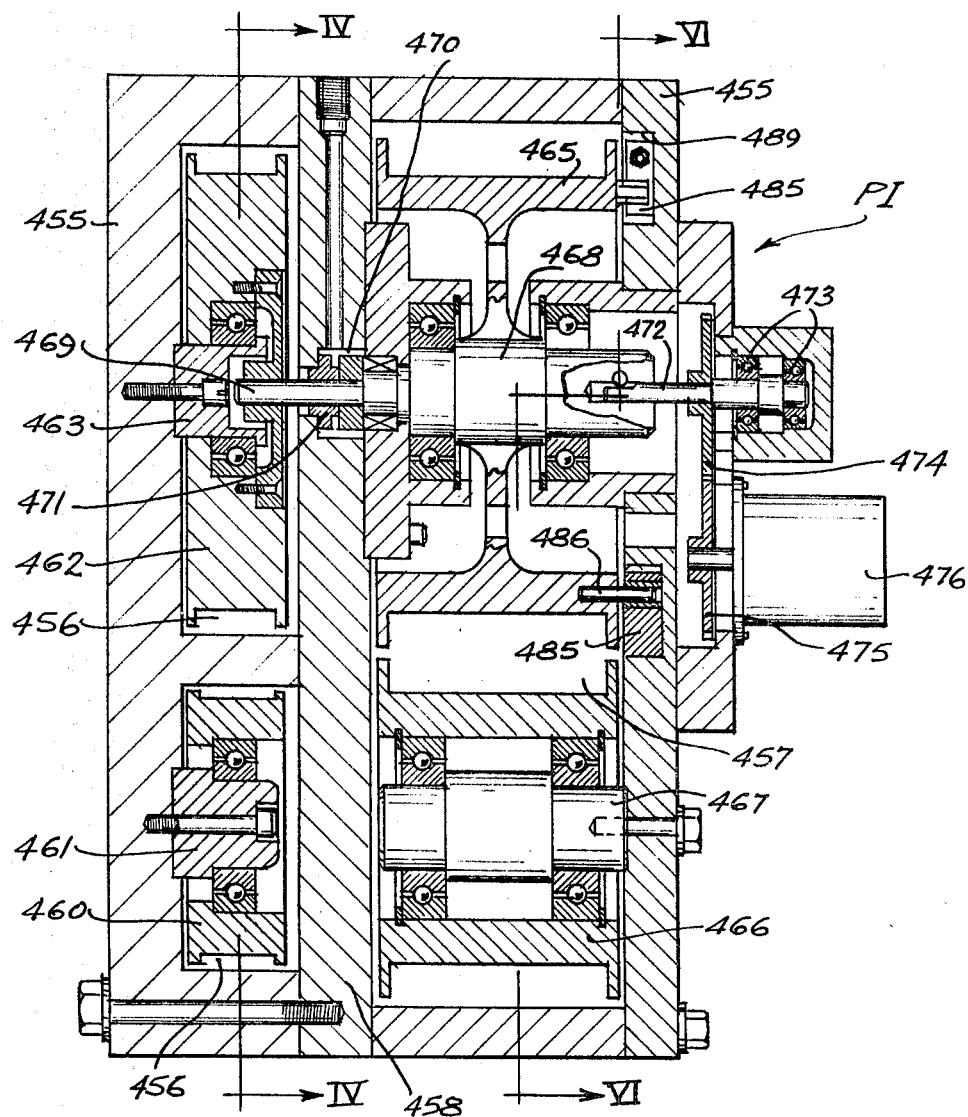
FIG. 5 is a cross-section of the indication unit on the lines V—V in FIG. 4 and FIG. 6.
Figure 6:
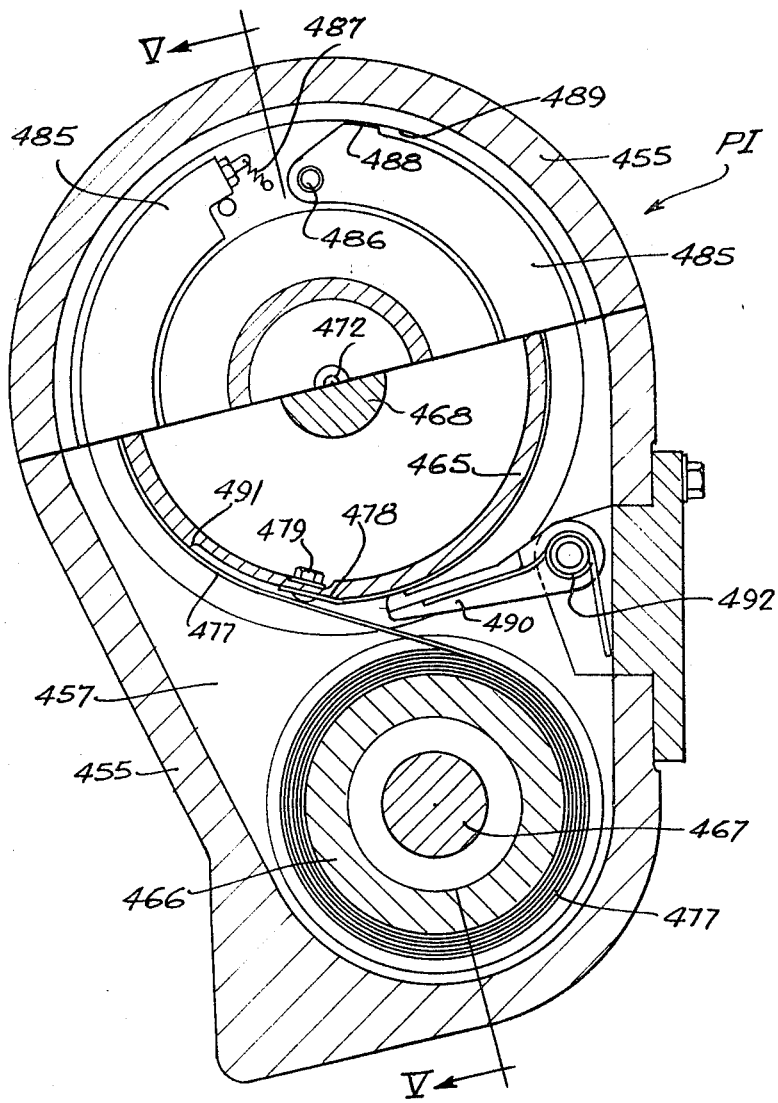
FIG. 6 is a section on the line VI—VI in FIG. 5.

Referring to FIGS. 4, 5 and 6, the position indication unit PI comprises a casing 455 subdivided into two chambers 456 and 457 by a separation wall 458. The chamber 456 communicates with the fuel barrel 122 via a mounting sleeve 459 and is thus filled with water while the other chamber 457 may be filled with air.

Disposed within the chamber 456 are a free-running pulley 460 rotatably mounted on a shaft 461, as well as a reel 462 rotatably mounted on a shaft 463 extending parallel to the shaft 461. The steel tape 166 extends from the pin 451 through the sleeve 450, through the mounting sleeve 459 and into the casing 455, runs around the pulley 460 and is wound up on the reel 462, its second end being fixed to the reel 462 by a screw 464.

Mounted in the other chamber 457 are two drums 465 and 466. The drum 466 is rotatably mounted on a shaft 467 the axis of which is aligned with the axis of the shaft 461. An axle 469 fixed to one side of the hub 468 of the drum 465 extends through an opening 470 in the separation wall 458 and is fixed to the reel 462. The axle 469 is sealed within the opening 470 by a fluid-tight seal 471. Extending from the other side of the hub 468 there is a shaft 472 which is rotatably mounted in the casing 455 by means of bearings 473. A gear 474 is mounted on the shaft 472 and meshes with another gear 475 mounted on the shaft of a potentiometer 476. The potentiometer 476 converts the rotational position of the shaft 472 and thereby of the reel 462 into an electric signal, thus indicating the position of the piston 160 within the fuel barrel 122.

Mounted on the drum 466 is a so-called "negator spring" tape 477 which is a tape so pretensioned in manufacture that its tendency is to return to a state in which it is coiled in a predetermined sense. Its free end 478 is wound around the drum 465 in a sense opposite to the predetermined coiling sense of the negator spring tape 477 and fixed to the drum 465 by a screw 479.

The negator spring tape 477 is shown in FIG. 6 in its most released condition corresponding to the most retracted position of the piston 160 shown in FIG. 4. As the piston 160 is moved towards the front end of the fuel barrel 122 by raising the water pressure at the inlet 453 over that existing in the space 115 of the fueling machine head L, the steel tape 166 is drawn off the reel 462 thereby rotating the axle 469 in a clockwise direction according to FIG. 4. Equally, the drum 465 is rotated in a clockwise direction thereby taking up the negator spring tape 477 against its coiling tendency and rotating the drum 466 in a counterclockwise direction. Simultaneously, the shaft of the potentiometer 476 is rotated in one direction. As the piston 160 is retracted into the fuel barrel 122 by lowering the water pressure at the inlet 453 below the pressure within the space 115 of the machine head L, the rotations of the reel 462, of the drums 465, 466 and of the potentiometer shaft are reversed due to the spring action of the negator spring tape 477.

Under normal operating conditions, the rotational speed of the reel 462 and the drums 465 and 466 is determined by the relatively slow motion of the piston 160, and the negator spring tape 477 is unwound from the drum 465 to a limit determined by an end face 480 of the piston 160 abutting against a stop surface 481. In order to limit the recoil action of the negator spring tape 477 in the event the steel tape 166 breaks, a centrifugal brake is provided which comprises two essentially semi-circular brake shoes 485 attached to one side of the drum 465. Each of the brake shoes 485 is at one end rotatably mounted on a pin 486, both pins being fixed to the drum 465 and extending parallel to the shaft 472. At their other ends, the brake shoes 485 are flexibly connected to the drum 465 by means of brake release springs 487. Upon excessive rotational speed of the drum 465, the brake shoes 485 fly outwardly thereby slightly rotating about the pins 486 until their braking areas 488 engage a cylindrical area 489 provided in the casing 455.

With the steel tape 166 broken, the recoiling of the negator spring tape 477 continues until a cam lever 49 engages a stop recess 491 provided in the cylindrical surface of the drum 465. Normally, the cam lever 490 rides on the uppermost layer of the negator spring tape 477 onto which it is lightly pressed by a spring 492.

FUEL UNLOADING AND RELOADING PROCEDURE

FIG. 7 shows in a series of small scale views designated a to h, the principal steps in a fuel unloading and reloading operation. FIG. 7a shows a reactor fuel channel D containing a closure plug R and shield plug S, together designated as the plug assembly T. The plug assembly T is connected to a tensioning mechanism 241 on the end of a fuel string V by means of a T-pin 239. It is assumed that the fuel string V consists of at least partly spent fuel and is to be removed from channel D and replaced by a fresh fuel string V' which is stored in a first one of the two fuel barrels 122 (here designated 122a) of the fueling machine head L. One of the ram barrels 121 is aligned with the channel D and the ram mechanism Q has been advanced to release the closure plug R.

The ram mechanism Q is now fully withdrawn (FIG. 7b), which action has the effect of drawing the plug assembly T down into the barrel 121 in such a manner as to align its T-pin 239 with the extreme end 270 (FIG. 2) of the barrel 121. A mechanism X in the machine head L, which is described in detail in the copending United States patent application 721,293 filed on Apr. 15, 1968 now ensures alignment of the open sides of a corresponding T-slot of the tensioning mechanism 241 at the end of the fuel string V with the circumferential direction of movement of the turret 102. A further mechanism W described in detail in the copending U.S. patent application 721,410 filed on Apr. 15, 1968 provides means for centering the T-pin 239 within the T-slot to avoid chafing during disengagement and for locking the fuel string temporarily in this position at this time. The circumferential alignment together with the fact that the fuel string cannot at this time move longitudinally permits the turret 102 to be indexed through 90°, which action is now carried out (FIG. 7c) with the effect that the T-pin 239 on the upper end of the plug assembly T is moved sideways out of its former engagement with the T-slot and is replaced by the T-pin 162 on the end of piston 160 in the other of the fuel barrels 122b, which second fuel barrel is empty at this time.

The next step (FIG. 7d) is to draw the fuel string V down into the fuel barrel 122b, and this effect is achieved by a gradual reduction of liquid pressure in the barrel 122b behind the piston 160 under the control of the valve 169.

The turret 102 is now indexed around by 180° to bring the fuel barrel 122a containing the fresh fuel string V' into register with the channel D, whereupon sufficient pressure is applied behind the piston 160 in the barrel 122a to force it to move upwardly against the liquid pressure in the channel itself, thus moving the fuel string V' into the channel D (FIG. 7e). With the new string locked in this position, the turret 102 is now again indexed through 90° to return the ram barrel 121 to alignment with the channel D (FIG. 7f), and thus connect the plug assembly T stored in the barrel 121 to the tensioning mechanism 241 of the new fuel string V'. The ram mechanism Q is then advanced to reinsert the plug assembly T with the fuel string V' attached thereto into the channel D (FIG. 7g).

Finally, the closure plug R is reinserted and again locked in the end of the channel D and the ram mechanism is retracted (FIG. 7h).

The liquid pressure inside the machine head L is then reduced, the shut-off valve 108 closed and the locking mechanism 106 of the machine head L released in order to disengage the fuelling machine head from the particular channel D that has been refuelled.

It will have been noticed that during the refuelling operation only one of the ram barrels 121 was used and indeed only one is strictly necessary. In practice, the second ram barrel houses a ram mechanism and a spare closure plug assembly which is inserted into the fuel channel in the event that the original plug is leaking or defective or that the complex ram mechanism does not function properly.

It will also be appreciated that only one fuel barrel 122 would be sufficient to unload and reload a reactor fuel channel D. In this case, however, it would be necessary to split the refuelling procedure into two steps. The first step would then comprise removing the closure plug assembly T, extracting the used fuel string V from the channel D, reinserting the closure plug assembly T and delivering the used fuel string V to a storage location. The second step would include obtaining a fresh fuel string V' from the storage location, reconnecting the machine head L to the channel D, again removing the closure plug assembly T, inserting the fresh fuel string V' into the channel D and again inserting the closure plug assembly T.

I claim:
1. In a fuelling machine for handling fuel strings in a nuclear reactor installation:
 (a) barrel means for housing a said fuel string, said barrel means having one end open, and inlet means at the other end of said barrel means for admitting pressure fluid;
 (b) a piston mounted for reciprocation within said barrel means for displacing said fuel string into and out of said barrel means; and
 (c) means for generating a fluid pressure difference between said open end and said inlet means for moving said piston in either direction,
 (d) wherein said barrel means includes an annular groove on its inner surface close to said open end, and wherein said piston includes stop means for resiliently engaging said groove.

2. A fuelling machine as in claim 1, wherein said stop means includes at least one stop arm mounted in a recess in the peripheral surface of said piston for pivoting about one end of said stop arm, and a spring urging the other end of said stop arm out of said recess.

3. In a fuelling machine for loading and unloading elongated fuel aggregates into and from fuel channels o a nuclear reactor, each said aggregate including a fuel string and a plug assembly for closing a said channel, said fuel string being substantially longer than said plug assembly:
 (a) a first barrel for housing a said fuel string;
 (b) a piston mounted for reciprocation within said first barrel for displacing said fuel string between said channel and said first barrel;
 (c) a second barrel for housing a said plug assembly; and
 (d) a ram mechanism movably mounted within said second barrel for releasing and extracting said plug assembly from said channel as well as for inserting and locking said plug assembly into said channel.

4. A fuelling machine as in claim 3, wherein one end of said first barrel is open and the other end is provided with inlet means for admitting pressure fluid, and further comprising means for generating a fluid pressure difference between said open end and said inlet means for moving said piston in either direction.

5. In a fuelling machine for handling fuel strings in a nuclear reactor installation:
 (a) barrel means for housing a said fuel string,
 (b) piston means reciprocably mounted in said barrel means for displacing said fuel string into and out of said barrel means; and
 (c) means for indicating the position of said piston means relative to said barrel means, said indicating means including
  (i) a casing mounted on said barrel means;
  (ii) a reel rotatably mounted in said casing;
  (iii) tape means having one end connected to said piston means and the other end connected to said reel;
  (iv) torque generating means including a spring tape having an inherent coiling tendency, one end of said spring tape being connected to apply torque to said reel in a sense to wind up said tape means; and
  (v) means for sensing the rotational position of said reel.

6. A fuelling machine as in claim 5, wherein said sensing means includes a potentiometer and gear means coupling the shaft of said potentiometer to said reel.

7. A fuelling machine as in claim 5, wherein said casing includes an intermediate wall dividing said casing into two chambers fluid-tightly sealed against each other, one of said chambers being connected to the interior of said barrel means and housing said reel, and the other one of said chambers housing said torque generating and sensing means.

8. A fuelling machine as in claim 5, wherein said torque generating means further includes a first drum for taking up the other end of said spring tape in its self-coiling sense, and a second drum coupled to said reel for winding up said one spring tape end against its self-coiling sense.

9. A fuelling machine as in claim 8, wherein said torque generating means further includes a centrifugal brake for preventing excessive speed of said drums upon breaking of said tape means.

10. A fuelling machine as in claim 8, wherein said torque generating means further includes stop means for stopping said second drum to prevent said spring tape from being disconnected from said second drum.

11. In a fuelling machine for handling fuel strings in a nuclear reactor installation:
 (a) barrel means for housing a said fuel string, said barrel means having one end open, and inlet means at the other end of said barrel means for admitting pressure fluid;
 (b) a piston mounted for reciprocation within said barrel means for displacing said fuel string into and out of said barrel means;
 (c) means for generating a fluid pressure difference between said open end and said inlet means for moving said piston in either direction, and
 (d) means for indicating the position of said piston relative to said barrel means.

12. A fueling machine as in claim 11, wherein said indicating means includes
 (i) a casing mounted on said barrel means;
 (ii) a reel rotatably mounted in said casing;
 (iii) tape means having one end connected to said piston and the other end to said reel;
 (iv) torque generating means including a spring tape having an inherent coiling tendency, one end of said spring tape being connected to apply torque to said reel in a sense to wind up said tape means; and
 (v) means for sensing the rotational position of said reel.

13. A fuelling machine as in claim 12, wherein said piston includes means for mounting said one end of said tape means for free rotation about the longitudinal axis of said piston.

References Cited

UNITED STATES PATENTS

| | | | |
|---|---|---|---|
| 3,157,579 | 11/1964 | Hummel | 176—30 |
| 3,169,910 | 2/1965 | Hummel | 176—31 |

FOREIGN PATENTS

| | | | |
|---|---|---|---|
| 828,055 | 2/1960 | Great Britain | 176—30 |

CARL D. QUARFORTH, Primary Examiner

H. E. BEHREND, Assistant Examiner

U.S. Cl. X.R.

214—18N